US007266294B2

(12) United States Patent
Aoki et al.

(10) Patent No.: US 7,266,294 B2
(45) Date of Patent: Sep. 4, 2007

(54) COUPLER-BASED OPTICAL CROSS-CONNECT (75) Inventors: Yasuhiko Aoki, Kanagawa (JP); Susumu Kinoshita, Plano, TX (US); Koji Takeguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 10/726,167

(22) Filed: Dec. 2, 2003

(65) Prior Publication Data
US 2005/0117909 A1 Jun. 2, 2005

(51) Int. Cl.
*H04J 14/02* (2006.01)

(52) U.S. Cl. .............................. 398/50; 398/56; 398/82

(58) Field of Classification Search .................. 398/49, 398/50, 56
See application file for complete search history.

(56) References Cited

U.S. PATENT DOCUMENTS

| 4,989,199 | A |   | 1/1991  | Rzeszewski ........................ 370/1 |
|-----------|---|---|---------|-------------------------------------------|
| 5,194,977 | A |   | 3/1993  | Nishio .......................... 359/128 |
| 5,446,809 | A |   | 8/1995  | Fritz et al. ....................... 385/17 |
| 5,450,224 | A |   | 9/1995  | Johansson .................... 359/128 |
| 5,452,115 | A |   | 9/1995  | Tomioka ...................... 359/123 |
| 5,642,447 | A |   | 6/1997  | Pan et al. ....................... 385/31 |
| 5,724,167 | A |   | 3/1998  | Sabella ......................... 359/128 |
| 5,739,935 | A |   | 4/1998  | Sabella ......................... 359/128 |
| 5,889,600 | A |   | 3/1999  | McGuire ...................... 359/128 |
| 5,959,767 | A |   | 9/1999  | Fatehi et al. ................... 359/341 |
| 6,154,583 | A | * | 11/2000 | Kuroyanagi et al. ........... 385/16 |
| 6,160,648 | A |   | 12/2000 | Oberg et al. .................. 359/110 |
| 6,192,172 | B1 |  | 2/2001  | Fatehi et al. .................... 385/17 |
| 6,327,059 | B1 |  | 12/2001 | Bhalla et al. .................. 359/109 |
| 6,335,992 | B1 | *| 1/2002  | Bala et al. ....................... 385/17 |
| 6,496,289 | B1 |  | 12/2002 | Kuroyanagi et al. ......... 359/128 |
| 6,532,090 | B1 | *| 3/2003  | Doerr et al. .................... 398/82 |

(Continued)

FOREIGN PATENT DOCUMENTS

EP          1 017 242 A1      7/2000

(Continued)

OTHER PUBLICATIONS

Chang, C.Y. et al. "Design and Analysis of a Multicasting and Fault-Tolerant Optical Crossconnect for All-Optical Networks." Photonic Network Communications. vol. 6, No. 3, Nov. 2003: 223-228.*

(Continued)

*Primary Examiner*—Kenneth Vanderpuye
(74) *Attorney, Agent, or Firm*—Baker Botts L.L.P.

(57) ABSTRACT

An optical cross-connect includes multiple input ports that each receives an optical input signal and multiple output ports that each output an optical output signal. The optical cross-connect also includes a distributing amplifier associated with each input port that generates multiple copies of the input signal received at the associated input port and multiple filter units that receive one or more of the copies and forward traffic in selected channels of particular copies. In addition, the optical cross-connect includes a combining amplifier associated with each output port that receives the traffic forwarded by one or more of the filter units and combines the received traffic into an output signal. Moreover, the optical cross-connect includes at least one upgrade input port and at least one upgrade output port expanding the capacity of the optical cross-connect, as well as associated upgrade distributing and combining amplifiers and upgrade filter units.

26 Claims, 3 Drawing Sheets

U.S. PATENT DOCUMENTS

| | | | |
|---|---|---|---|
| 6,813,408 B2 * | 11/2004 | Bortolini | 385/17 |
| 6,959,128 B2 * | 10/2005 | Castanon et al. | 385/16 |
| 7,079,723 B2 * | 7/2006 | Bortolini et al. | 385/16 |
| 2002/0071151 A1 | 6/2002 | Zaacks et al. | |
| 2002/0197000 A1 * | 12/2002 | Marom | 385/17 |
| 2004/0208550 A1 * | 10/2004 | Weverka et al. | 398/50 |
| 2004/0208551 A1 * | 10/2004 | Weverka | 398/50 |

OTHER PUBLICATIONS

Koga, M. et al. "Large-capacity optical path cross-connect system for WDM photonic transport network." IEEE Journal on Selected Areas in Communications. vol. 16, No. 7, Sep. 1998: 1260-1269.*

Magnus Grenfeldt, "Erion—Ericsson Optical Networking Using WDM Technology", Ericsson Review No. 3, 1998, pp. 132-137.

Allan Ashmead, DigiLens, Inc., "RoadMap for Metro Market", Fiberoptic Product News, Oct. 2001, 3 pages.

Rob Batchellor, "Optical Networking the Ericsson Way", Ericcson Limited, Business Unit Transport and Cable Networks, pp. 1-4, Feb. 22, 2002.

Castanon et al., U.S. Appl. No. 10/726,157, entitled Coupler-Based Optical Cross-Connect Having a Regeneration Module, filed Dec. 2, 2003.

* cited by examiner

COUPLER-BASED OPTICAL CROSS-CONNECT

TECHNICAL FIELD OF THE INVENTION

The present invention relates generally to optical transport systems, and more particularly to a coupler-based optical cross-connect.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

Optical cross-connects (OXCs) are often used for wavelength path routing in optical networks. In the typical OXC node, array waveguide gratings (AWGs) are used for demultiplexing the WDM/DWDM signal into its constituent wavelengths and an optical switch (typically based on micro electromechanical system (MEMS) technology or planar lightwave circuit (PLC) technology) is used for cross-connecting signals in the various wavelengths between various optical paths.

Because AWGs have fixed channel spacing and a fixed number of output ports, these devices limit the channel spacing and switching flexibility of an OXC node. Furthermore, optical switches based on MEMS technology have several problems, such as control of the mirrors used to switch signals between optical paths, integration of input-output fibers, and large insertion loss. In addition, PLC-based optical switches use thermal control for changing the optical path of signals, which typically creates a low switching speed and large device size. For these reasons, among others, current OXC node configurations are very complicated and are expensive to build and implement.

SUMMARY

In accordance with a particular embodiment of the present invention, an optical cross-connect includes multiple input ports that each receive an optical input signal and multiple output ports that each output an optical output signal. The optical cross-connect also includes a distributing amplifier associated with each input port that generates multiple copies of the input signal received at the associated input port. Furthermore, the optical cross-connect includes multiple filter units that receive a copy of one or more of the input signals from one or more of the distributing amplifiers and forward traffic in selected channels of one or more of the received copies. In addition, the optical cross-connect includes a combining amplifier associated with each output port. Each combining amplifier receives the traffic in one or more of the channels forwarded by one or more of the filter units and combines the received traffic into an output signal to be output from the associated output port.

Technical advantages of one or more embodiments of the present invention may include providing a coupler-based optical cross-connect that does not require the use of multiplexer or demultiplexers. Therefore, such embodiments may provide switching wavelength flexibility since there are no inherent channel number or channel spacing limitations when using optical couplers (unlike optical cross-connects that use multiplexers and demultiplexers). Furthermore, the use of optical couplers or similar passive waveguide components provides for a more reliable and low-cost product. In addition, the modular architecture of particular embodiments allows for incremental upgrades ("pay as you grow") and in-service upgrades.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Figure 1:
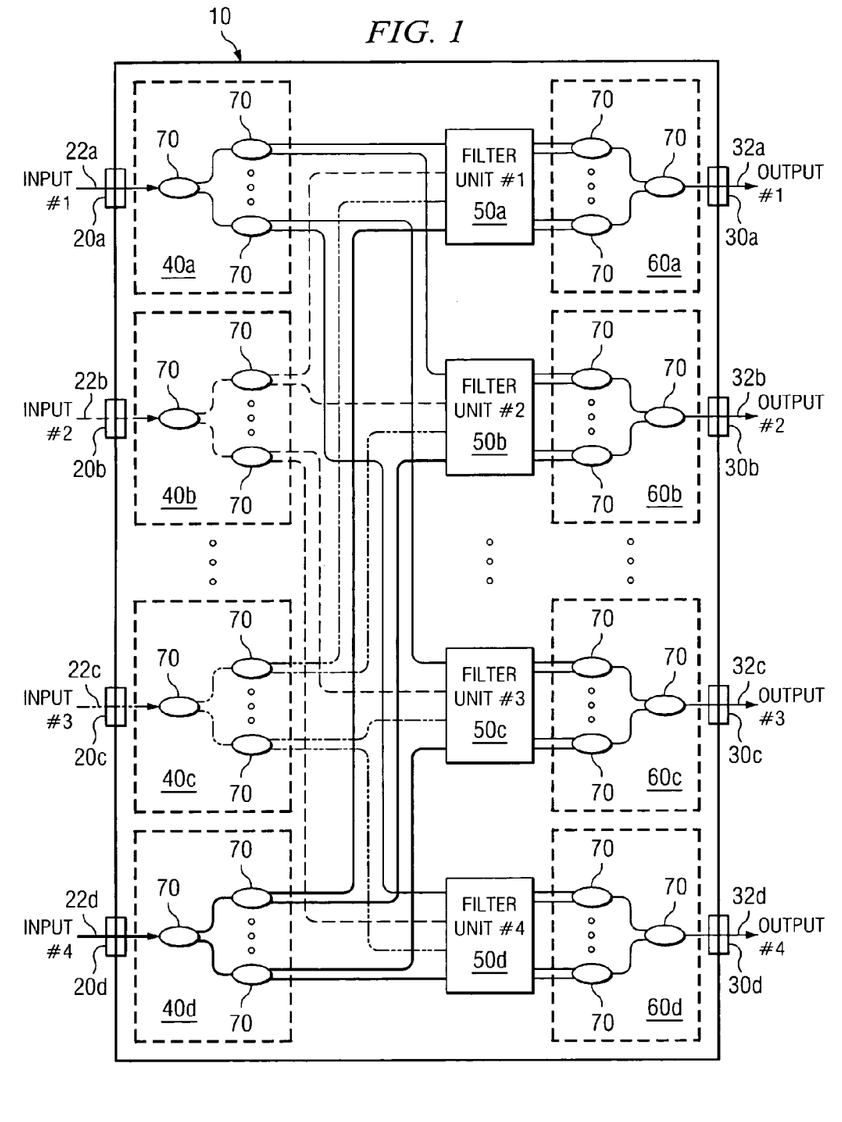
FIG. 1 is a block diagram illustrating an optical cross-connect in accordance with one embodiment of the present invention.

FIG. 1 is a block diagram illustrating an optical cross-connect (OXC) 10 in accordance with one embodiment of the present invention. OXCs may be implemented in optical networks in which a number of optical channels are carried over a common path in disparate channels (for example, networks implementing wavelength division multiplexing (WDM), dense wavelength division multiplexing (DWDM), or any other suitable multiplexing technique). OXCs may be used in a variety of implementations for a variety of different purposes, but their basic function is to switch the information carried in one or more channels of one or more input signals to one or more channels of one or more output signals.

As an example only, OXC 10 includes four input ports 20a-20d that are operable to receive four different input signals 22a-22d. As described below, although four input ports 20 and input signals 22 are illustrated, any suitable number of ports 20 and signals 22 may be implemented and/or used. In certain embodiments, each input signal 22 may compromise a signal received over an optical fiber that is coupled to the corresponding input port 20. Each input signal 22 may comprise a number of channels that are each able to carry separate information ("traffic"). The traffic in each channel of a particular input signal 22 may be forwarded or "switched" by OXC 10 to any of a number of output ports 30a-30d and be communicated as a part of an associated output signal 32a-32d. As an example only, the traffic in a channel of input signal 22a may be forwarded from OXC 10 as a channel of output signal 32c. As with input ports 20, although only four output ports 30 are illustrated, any suitable number of output ports 30 and associated output signals 32 may be implemented and/or used in OXC 10.

OXC 10 is able to forward a particular channel of one input signal 22 to a particular output port 30 using a series of distributing amplifiers 40, wavelength filter units 50 (which also may be referred to as wavelength select units or wavelength blockers), and combining amplifiers 60. As illustrated in FIG. 1, there may be a distributing amplifier 40 associated with each input port 20. Each distributing amplifier 40 receives a signal from its associated input port 20 and makes multiple copies of the input signal 22 to be forwarded to one or more filter units 50. Each distributing amplifier 40 may make a copy of its associated input signal 22 for each of the filter units 50 in OXC 10 (so as to allow any input channel to be forwarded to any output signal 32). However, any other suitable number of copies of an input signal 22 may be made by each distributing amplifier 40. Although not illustrated for ease of viewing, each distributing amplifier 40 may include one or more amplifiers positioned in the fiber span between any two couplers 70 and/or between a coupler 70 and a filter unit 50 to amplify the copies of an input signal 22 made by the distributing amplifier 40. Any suitable amplifiers may be used for this purpose.

Each distributing amplifier 40 uses a series of optical couplers 70 to make the copies of the associated input signal 22. Optical couplers 70 may each comprise an optical fiber coupler or other optical device operable to combine and/or split an optical signal. As used herein, the terms "optical coupler" and "coupler" refer to any device operable to combine or otherwise generate a combined optical signal based on two or more input optical signals without multiplexing and/or operable to split or divide an input optical signal into discrete optical signals based on the input optical signal without demultiplexing. The discrete signals may be similar or identical in frequency, form, and/or content. For example, the discrete signals may be identical in content and identical or substantially similar in power, may be identical in content and differ substantially in power, or may differ slightly or otherwise in content.

In the illustrated embodiment, the couplers 70 of each distributing amplifier 40 are 1×2 couplers that split an input signal into two copies with substantially equal power and substantially identical content. The couplers 70 are cascaded such that a first coupler 70 receives the associated input signal 22 and creates two copies of the signal. Each of these copies is then forwarded to different couplers 70, each of which makes a copy of the received copy. In this manner, four copies of each input signal 22 are created by each distributing amplifier 40. However, any appropriate number of couplers 70 may be used to create any suitable number of copies. For example, in embodiments in which a copy of each input signal 22 is made for each filter unit 50, each distributing amplifier 40 will have a suitable number of couplers to make these copies. Therefore, although a "two-tier" cascade of couplers 70 is shown for each distributing amplifier 40, any number of tiers may be used. Furthermore, in certain embodiments, couplers may be used that create more than two copies of the signal received by the coupler. The use of such couplers may therefore reduce the number of couplers used in each distributing amplifier 40.

The copies of the associated input signal 22 that are generated at each distributing amplifier 40 are forwarded from the distributing amplifier 40 to one or more filter units 50. For example, in the illustrated embodiment, a copy is forwarded to each of the filter units 50. Filter units 50 comprise one or more filters that forward particular channels of each signal received by the filter unit 50 (the copies of the various input signals 22*a*-22*d*). As described in further detail with reference to FIG. 2, in particular embodiments, each filter unit 50 may include a separate filter associated with each incoming signal. In such a case, each filter is configured to forward (pass) one or more channels of the associated input signal and to terminate (reject) the remaining channels. For example, if the traffic in a first channel of input signal 22*a* is to be forwarded or "switched" to output port 30*c*, then the filter of filter unit 50*c* that receives the copy of input signal 22*a* will be configured to forward the first channel of this signal. This channel (along with any other channels of input signal 22*a* that are also forwarded) will then be output from filter unit 50*c* to combining amplifier 60*c*. Selected channels of the other input signals 22*b*-22*d* may similarly be forwarded by associated filters of filter unit 50*c* and be output to combining amplifier 60*c*. Further details regarding the operation of filter units 50 are provided below with reference to FIG. 2.

As described above, the selected channels of the various input signals 22 that are output by each filter unit 50 are forwarded to an associated combining amplifier 60. As with distributing amplifiers 40, combining amplifiers 60 are comprised of one or more couplers 70. However, instead of splitting a received signal into multiple copies of that signal, combining amplifiers 60 operate in a reverse fashion to combine multiple signals received from the associated filter unit 50 into a single signal. For example, in the illustrated embodiment, filter unit 50*a* may forward particular channels from each of signals 22*a*-22*d* to combining amplifier 60*a*. A first coupler 70 of combining amplifier 60*a* may combine the forwarded channels from signal 22*a* with those from signal 22*b*, and a second coupler 70 may combine the forwarded channels from signal 22*c* with those from signal 22*d*. A third coupler 70 may then combine these two combined signals into a signal comprising the forwarded channels from all of signals 22*a*-22*d*. This is the output signal 32*a* that is forwarded from the associated output port 32*a*. As with distributing amplifiers 40, combining amplifiers 60 may include an appropriate number and type of couplers 70. Furthermore, combining amplifiers 60 may also include amplifiers to amplify the signals being combined in combining amplifiers 60.

In operation, OXC 10 receives multiple input signals 22 that each contain multiple channels of traffic. A copy of each of these signals is forwarded to one or more filter units 50 that are each associated with a different output port 30. Each filter unit 50 then selects (through filtering) one or more (or no) channels from each received input signal 22 to forward to its associated output port 30. This filtering may be performed such that the same channel from two different input signals 22 will not be forwarded by a filter unit 50 (to prevent interference). The selected channels of each of the input signals 22 are then forwarded from each filter unit 50, are combined using the associated combining amplifier 60, and are forwarded from an associated output port 30 as an output signal 32. In this manner, any channel of any input signal 22 may be output from any output port 30 of OXC 10. It should be understood that although four input ports 20 (and associated signals 22) and four output ports 30 (and associated signals 32) are illustrated, any appropriate number of input ports and output ports may be implemented. Furthermore, the number of input ports 20 need not equal the number of output ports 30 and the OXC 10 may not necessarily be configured to forward selected channels from every input port 20 to every output port 30.

In particular embodiments, ports 20 and 30, distributing amplifiers 40, filter units 50, and combining amplifiers 60 may each be implemented as a discrete card and are interconnected through a backplane of a card shelf. Alternatively, the functionality of one or more of these elements may be distributed across a plurality of discrete cards. In this way, OXC 10 is modular, upgradeable, and provides a "pay-as-you-grow" architecture. The components of OXC 10 may be coupled by direct, indirect, or other suitable connection or association. In the illustrated embodiment, the elements and devices in the elements are connected with optical fiber connections, however, other embodiments may be implemented in part or otherwise with planar wave guide circuits and/or free space optics.

Figure 2:
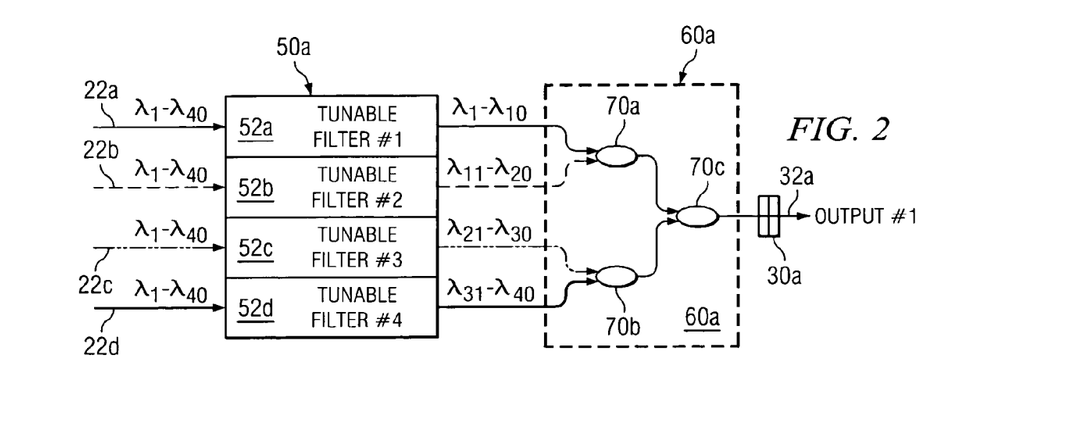
FIG. 2 is a block diagram illustrating a filter unit and a combining amplifier of an optical cross-connect in further detail in accordance with one embodiment of the present invention.

FIG. 2 is a block diagram illustrating filter unit 50a and combining amplifier 60a of OXC 10 in further detail. Combing amplifier 50a includes four separate tunable filters 52 (although other appropriate filters may be used)—one filter 52 for each incoming copy of an input signal 22. More specifically, in the illustrated embodiment, filter 52a receives a copy of input signal 22a (from distributing amplifier 40a of OXC 10), filter 52b receives a copy of input signal 22b (from distributing amplifier 40b of OXC 10), filter 52c receives a copy of input signal 22c (from distributing amplifier 40c of OXC 10), and filter 52d receives a copy of input signal 22d (from distributing amplifier 40d of OXC 10). It will be understood, however, that any suitable number of filters 52 may be implemented and any appropriate number of signals 22 may be received.

Filters 52 may comprise tunable filters (such as acoustic optical tunable filters), filters using virtually imaged phased array technology, thin-film filters, fixed filters, or any other suitable filters. Furthermore, each filter 52 may comprise a single filter or a plurality of filters connected serially, in parallel, or otherwise. Filters 52 may also be used to filter out amplified spontaneous emissions (ASE).

In operation, the filters 52 of the example filter unit 50a each receive their respective input signal 22. Each filter 52 is configured to allow selected channels of the input signal to pass through the filter 52. As described above, the channels that are passed through each filter 52 are the channels that are desired to be combined and output as output signal 32a. As an example only and not by way of limitation, assuming that each input signal 22 includes forty occupied channels (which may often not be the case), tunable filter 52a may be configured to forward the first group of ten channels of input signal 22a ("$\lambda_1$-$\lambda_{10}$"), tunable filter 52b may be configured to forward the second group of ten channels of input signal 22b ("$\lambda_{11}$-$\lambda_{20}$"), tunable filter 52c may be configured to forward the third group of ten channels of input signal 22c ("$\lambda_{21}$-$\lambda_{30}$"), and tunable filter 52d may be configured to forward the last group of ten channels of input signal 22d ("$\lambda_{31}$-$\lambda_{40}$"). Obviously, any other suitable combination of channels may be selected from each input signal 22, and output signal 32a does not need to have every available channel occupied with traffic.

Continuing with the example above, filter 52a forwards $\lambda_1$-$\lambda_{10}$ of signal 22a to coupler 70a of combining amplifier 60a, and filter 52b also forwards $\lambda_{11}$-$\lambda_{20}$ of signal 22b to coupler 70a. Coupler 70a combines those two signals. Furthermore, filter 52c forwards $\lambda_{21}$-$\lambda_{30}$ of signal 22c to coupler 70b, and filter 52d also forwards $\lambda_{31}$-$\lambda_{40}$ of signal 22d to coupler 70b. Coupler 70b combines those two signals. The combined signals are then forwarded from couplers 70a and 70b to coupler 70c, which combines the two received signals into an output signal 32a. As described above, any suitable number of couplers 70 may be used to combine the selected channels from each input signal 22. Furthermore, amplifiers may be used to amplify any of the signals forwarded through combining amplifier 60a to compensate for coupler and filter losses and to provide power level control.

Figure 3:
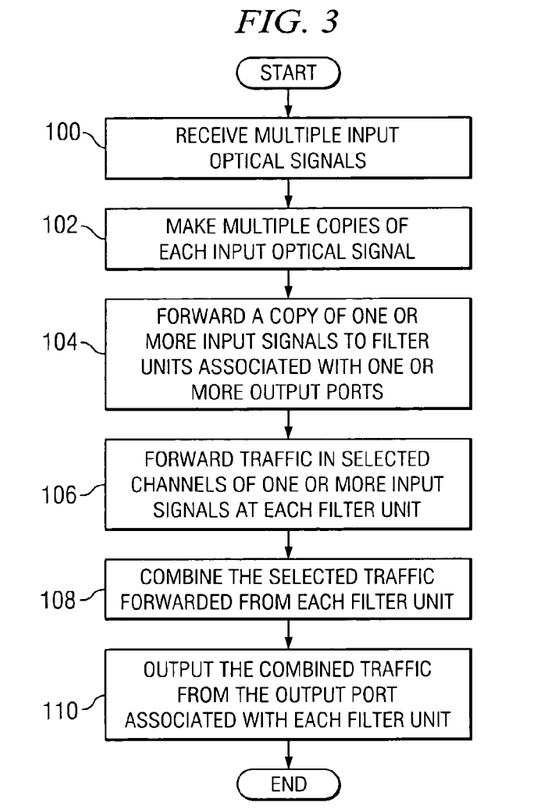
FIG. 3 is a flowchart illustrating an example method for cross-connecting optical signals.

FIG. 3 is a flowchart illustrating an example method for cross-connecting optical signals. The method begins at step 100 where multiple input optical signals are received at an OXC or similar device. At step 102, multiple copies are made of each input optical signal. As described above, couplers may be used to make these copies. At step 104, a copy of one or more of the input signals are forwarded to a number of filter units associated with one or more output ports. In an example embodiment, a copy of each input signal is forwarded to each filter unit so that any portion of any input signal may be output from any output port. However, it is not necessary that this be performed. At step 106, each filter unit forwards the traffic in selected channels of one or more of the input signals (of which a copy of which was received by the filter unit). The traffic in the other, non-selected channels may be terminated. At step 108, the traffic in each of the input signal channels forwarded by a particular filter unit is combined, and the combined traffic is communicated as an output signal from an output port associated with each filter unit at step 110. In this manner, traffic in a particular channel of an input signal may be forwarded to a desired output port to be communicated as part of the associated output signal.

Figure 4:
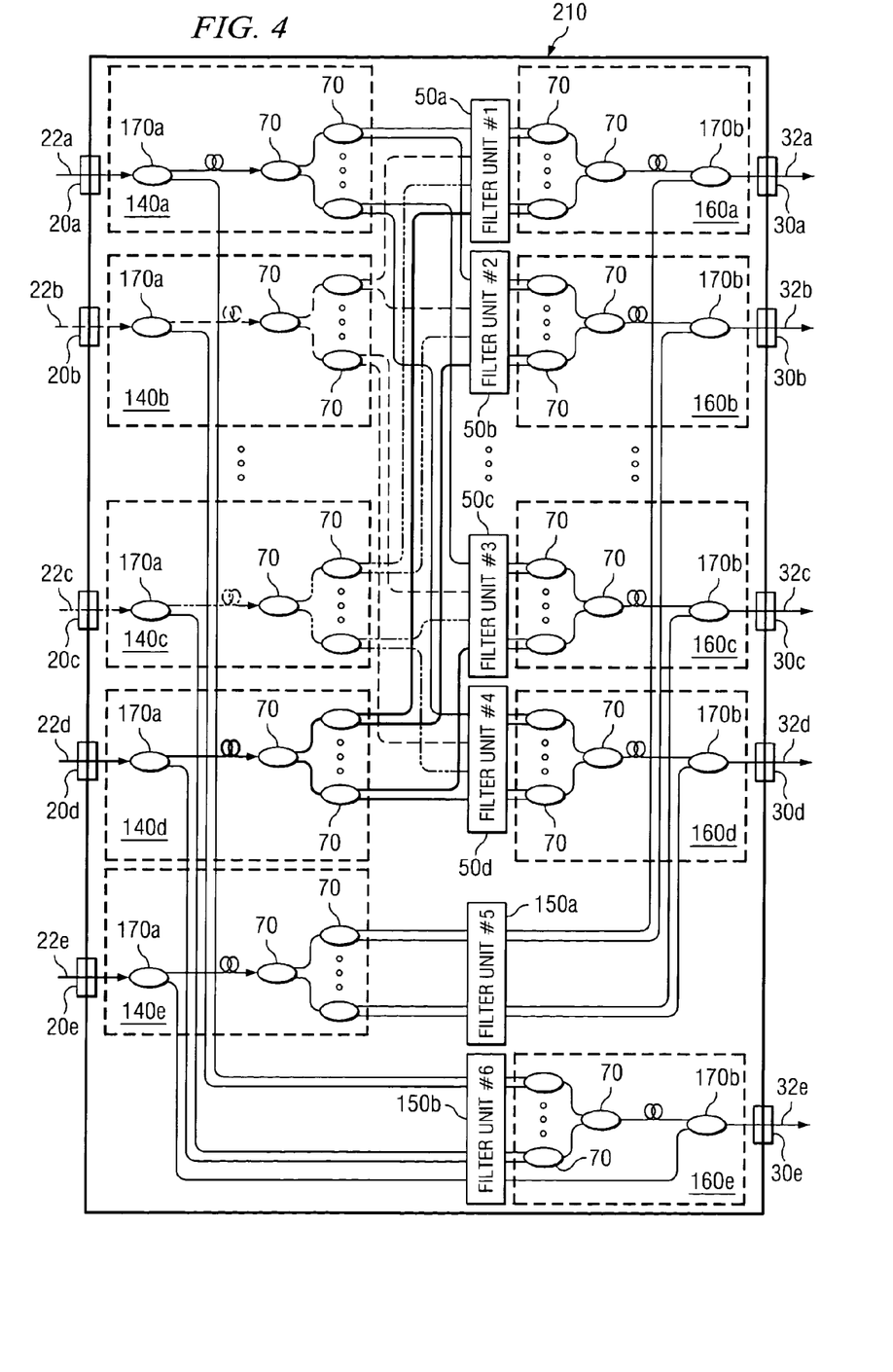
FIG. 4 is a block diagram illustrating an upgraded optical cross-connect in accordance with one embodiment of the present invention.

FIG. 4 is a block diagram illustrating an upgraded OXC 210 according to one embodiment of the present invention. OXC 210 represents OXC 10 of FIG. 1 after being upgraded to add an additional input port 20e and an additional output port 30e. Due to the modular architecture of OXC 10 and other OXCs constructed according to certain embodiments of the present invention, such OXCs may be easily upgraded to accommodate additional input and output signals, as described below. Although components for adding a single additional input port 20 and output port 30 are illustrated, it should be understood that additional sets of these components may be used to add additional input and/or output ports.

OXC 210 includes many of the same components of OXC 10 as well as other similar components that are slightly modified to accommodate the additional input port 20e and output port 30e. For example, OXC 210 includes filter units 50a-50d that are the same as the filters 50a-50d of OXC 10. In addition, OXC 210 includes a filter 150a for forwarding selected channels of an input signal 22e to output ports 30a-30d. OXC 210 also includes a filter unit 150b for forwarding selected channels from input signals 22a-22e to output port 30e. Filter units 150a and 150b may be constructed similarly to filters 50, described above.

OXC 210 further includes multiple distributing amplifiers 140a-140e for distributing copies of an input signal 22 received at the associated input port 20 to appropriate filter units. Distributing amplifiers 140a-140d operate similarly to and may be constructed similarly to distributing amplifiers 40a-40d of OXC 10, except that distributing amplifiers 140a-140d each include an additional coupler 170a that is configured to forward a copy of the associated input signal 22 to filter unit 150b. The other couplers 70 of each distributing amplifier 140a-140d operate in the manner described above with respect to amplifiers 40a-40d to create additional copies of the associated input signal 22 for filter units 50a-50d. Couplers 170a may be the same as or similar to couplers 70. Furthermore, although a particular positioning of couplers 170a is illustrated (a positioning that may provide for ease of installation), the additional coupler that may be added for each new input port 20 may be positioned at any appropriate location. Distributing amplifier 140e may comprise the same components as and operate in a similar fashion as amplifiers 140a-140d to create multiple copies of input signal 22e; however, as illustrated in FIG. 4, all of these copies are directed to filter unit 150a instead of being distributed to multiple filter units. As described above, distributing amplifiers 140a-140e may include suitable amplifiers to amplify any of the signal copies made by distributing amplifiers 140.

OXC 210 also includes multiple combining amplifiers 160a-160e for combining the traffic received from an associated filter unit 50 and from filter unit 150a. Combining amplifiers 160a-160d operate similarly to and may be constructed similarly to combining amplifiers 60a-60d of OXC 10, except that combining amplifiers 160a-160d each include an additional coupler 170b that is configured to receive traffic in selected channels from input signal 22e and combine that traffic with other traffic received from the associated filter unit 50. The other couplers 70 of each combining amplifier 160a-160d operate in the manner described above with respect to amplifiers 60a-60d to combine this traffic from the associated filter unit 50. Couplers 170b may be the same as or similar to couplers 70. Combining amplifier 160e may comprise the same components as and operate in a similar fashion as amplifiers 160a-160d to combine the traffic forwarded from filter unit 150b; however, as illustrated in FIG. 4, the traffic received at coupler 170b is also from filter unit 150b instead of filter unit 150a. As described above, combining amplifiers 160a-160e may include suitable amplifiers to amplify any of the signal copies made by combining amplifiers 160.

In operation, input signals 22a-22e are received at input ports 20a-20e of OXC 210. Each input signal is received at an associated distributing amplifier 140. Each distributing amplifier 140a-140d makes multiple copies of the associated input signal 22 and forwards a copy to each of filter units 50a-50d and to filter unit 150b. Distributing amplifier 140e makes multiple copies of the associated input signal 22e, forwards one copy to filter unit 150b, and forwards the remaining copies to filter unit 150a. As described above with reference to OXC 10, each filter unit 50a-50d then selects (through filtering) one or more (or no) channels from each input signal 22a-22d to forward to its associated output port 30. Filter unit 150a receives copies of input signal 22e and selects one or more (or no) channels from each of the copies for forwarding to each of output ports 30a-30d. Filter unit 150b receives copies of each input signal 22a-22e and selects one or more (or no) channels from each input signal 22a-22e to forward to its associated output port 30e.

The selected channels of each of the input signals 22 are then combined using combining amplifiers 160 and forwarded from an associated output port 30 as an output signal 32. In this manner, any channel of any input signal 22 may be output from any output port 30 of OXC 210. Furthermore, the upgrade of OXC 10 to OXC 210 allowing this cross-connect capability for an additional input port 20e and 30e can be accomplished without modifying the operation of the components of OXC 10, but by simply adding couplers 170a and 170b, distributing amplifier 140e, combining amplifier 160e, and filter units 150a and 150b. As described above, it should be understood that although five input ports 20 (and associated signals 22) and five output ports 30 (and associated signals 32) are illustrated, any appropriate number of input ports and output ports may be implemented and/or used. Furthermore, the number of input ports need not equal the number of output ports and OXC 210 may not necessarily be operable to forward selected channels from every input port 20 to every output port 30. In addition, although a particular configuration for upgrading OXC 10 is illustrated in FIG. 4, other appropriate upgrading techniques may be used.

Although the present invention has been described with several embodiments, various changes and modifications may be suggested to one skilled in the art. It is intended that the present invention encompass such changes and modifications as fall within the scope of the appended claims.

What is claimed is:

1. An optical cross-connect comprising:
   a plurality of input ports each operable to receive an optical input signal, each input signal comprising a plurality of channels that are each operable to carry optical traffic;
   a plurality of output ports each operable to output an optical output signal;
   a distributing amplifier associated with each input port, each distributing amplifier operable to generate a plurality of copies of the input signal received at the associated input port;
   a plurality of filter units each operable to:
      receive a copy of one or more of the input signals from one or more of the distributing amplifiers; and
      forward traffic in selected channels of one or more of the copies; and
   a combining amplifier associated with each output port, each combining amplifier operable to:
      receive the traffic in one or more of the channels forwarded by one or more of the filter units; and
      combine the received traffic into an output signal to be output from the associated output port;
   the optical cross-connect further comprising:
      at least one upgrade input port and at least one upgrade output port expanding the capacity of the optical cross-connect;
      an upgrade distributing amplifier associated with the upgrade input port and an upgrade combining amplifier associated with the upgrade output port;
      a first upgrade filter unit operable to receive a plurality of copies of an input signal received at the upgrade input port, the first upgrade filter unit coupled to each of the combining amplifiers associated with the plurality of output ports and operable to forward traffic in selected channels of one or more of the copies to the combining amplifiers; and
      a second upgrade filter unit operable to receive a copy of one or more of the input signals from one or more of the distributing amplifiers associated with the plurality of input ports and to forward traffic in selected channels of one or more of the copies to the upgrade combining amplifier associated with the upgrade output port.

2. The optical cross-connect of claim 1, wherein the distributing amplifiers each comprise a plurality of passive optical couplers operable to generate the plurality of copies of the associated input signal.

3. The optical cross-connect of claim 1, wherein the combining amplifiers each comprise a plurality of passive optical couplers operable to combine the received traffic into the associated output signal.

4. The optical cross-connect of claim 1, wherein the filter units are each operable to forward traffic in one or more selected channels by passing the traffic in selected channels and terminating the traffic in the remaining channels.

5. The optical cross-connect of claim 1, wherein each filter unit comprises one or more filters, each filter operable to receive a copy of an input signal and to pass the traffic in selected channels and to terminate the traffic in the remaining channels of the particular input signal.

6. The optical cross-connect of claim 5, wherein the filters comprise tunable filters.

7. The optical cross-connect of claim 1, wherein a filter unit is associated with each output port.

8. The optical cross-connect of claim 7, wherein a copy of each input signal is forwarded to each filter unit so that any channel of any input signal may be output from any output port.

9. The optical cross-connect of claim 1, wherein the filter units are configured so that each combining amplifier receives only non-interfering channels from the filter units.

10. An optical cross-connect comprising:
a plurality of input ports each operable to receive an optical input signal, each input signal comprising a plurality of channels that are each operable to carry optical traffic;
a plurality of output ports each operable to output an optical output signal;
a distributing amplifier associated with each input port, each distributing amplifier comprising a plurality of passive optical couplers operable to generate a plurality of copies of the input signal received at the associated input port;
a plurality of filter units each comprising a plurality of filters, each filter operable to:
receive a copy of a particular input signal from a distributing amplifier;
forward the traffic in selected channels of the input signal; and
terminate the traffic in the remaining channels of the input signal; and
a combining amplifier associated with each output port, each combining amplifier operable to receive the traffic in one or more of the channels forwarded by one or more of the filter units, each combining amplifier comprising a plurality of passive optical couplers operable to combine the received traffic into an output signal to be output from the associated output port;
the optical cross-connect further comprising:
at least one upgrade input port and at least one upgrade output port expanding the capacity of the optical cross-connect;
an upgrade distributing amplifier associated with the upgrade input port and an upgrade combining amplifier associated with the upgrade output port;
a first upgrade filter unit operable to receive a plurality of copies of an input signal received at the upgrade input port, the first upgrade filter unit coupled to each of the combining amplifiers associated with the plurality of output ports and operable to forward traffic in selected channels of one or more of the copies to the combining amplifiers; and
a second upgrade filter unit operable to receive a copy of one or more of the input signals from one or more of the distributing amplifiers associated with the plurality of input ports and to forward traffic in selected channels of one or more of the copies to the upgrade combining amplifier associated with the upgrade output port.

11. The optical cross-connect of claim 10, wherein the filters comprise tunable filters.

12. The optical cross-connect of claim 10, wherein a filter unit is associated with each output port.

13. The optical cross-connect of claim 12, wherein a copy of each input signal is forwarded to each filter unit so that any channel of any input signal may be output from any output port.

14. The optical cross-connect of claim 10, wherein the filter units are configured so that each combining amplifier receives only non-interfering channels from the filter units.

15. A method for cross-connecting optical signals, comprising:
receiving an optical input signal at each of a plurality of input ports, each input signal comprising a plurality of channels that are each operable to carry optical traffic;
generating a plurality of copies of each input signal;
receiving a copy of one or more of the input signals at each of a plurality of filter units;
forwarding traffic in selected channels of one or more of the copies received at each filter unit to one or more output ports;
receiving the traffic in one or more of the channels forwarded by one or more of the filter units at a plurality of output ports; and
combining the traffic received at each output port into an optical output signal to be output from the output port;
upgrading the optical cross-connect to further include:
at least one upgrade input port and at least one upgrade output port expanding the capacity of the optical cross-connect;
an upgrade distributing amplifier associated with the upgrade input port and an upgrade combining amplifier associated with the upgrade output port;
a first upgrade filter unit operable to receive a plurality of copies of an input signal received at the upgrade input port, the first upgrade filter unit coupled to each of the plurality of output ports and operable to forward traffic in selected channels of one or more of the copies to one or more of the output ports; and
a second upgrade filter unit operable to receive a copy of one or more of the input signals from one or more of the plurality of input ports and to forward traffic in selected channels of one or more of the copies to the upgrade combining amplifier associated with the upgrade output port.

16. The method of claim 15, wherein the plurality of copies of each input signal are generated using a plurality of passive optical couplers.

17. The method of claim 15, wherein the traffic received at each output port is combined using a plurality of passive optical couplers.

18. The method of claim 15, wherein forwarding the traffic in one or more selected channels of a copy of an input optical signal comprises passing the traffic in selected channels of the signal and terminating the traffic in the remaining channels of the signal.

19. The method of claim 15, wherein a filter unit is associated with each output port.

20. The method of claim 19, wherein a copy of each input signal is forwarded to each filter unit so that any channel of any input signal may be output from any output port.

21. The method of claim 15, wherein only non-interfering channels of different input signals are forwarded to a particular output port.

22. A method for cross-connecting optical signals, comprising:

receiving an optical input signal at each of a plurality of input ports, each input signal comprising a plurality of channels that are each operable to carry optical traffic;

generating a plurality of copies of each input signal using a plurality of passive optical couplers;

receiving a copy of one or more of the input signals at each of a plurality of filter units;

forwarding traffic in selected channels of one or more of the copies received at each filter unit to one or more output ports;

receiving the traffic in one or more of the channels forwarded by one or more of the filter units at a plurality of output ports; and combining the traffic received at each output port into an optical output signal to be output from the output port using a plurality of passive optical couplers;

upgrading the optical cross-connect to further include:
- at least one upgrade input port and at least one upgrade output port expanding the capacity of the optical cross-connect;
- an upgrade distributing amplifier associated with the upgrade input port and an upgrade combining amplifier associated with the upgrade output port;
- a first upgrade filter unit operable to receive a plurality of copies of an input signal received at the upgrade input port, the first upgrade filter unit coupled to each of the plurality of output ports and operable to forward traffic in selected channels of one or more of the copies to one or more of the output ports; and
- a second upgrade filter unit operable to receive a copy of one or more of the input signals from one or more of the plurality of input ports and to forward traffic in selected channels of one or more of the copies to the upgrade combining amplifier associated with the upgrade output port.

23. The method of claim 22, wherein forwarding the traffic in one or more selected channels of a copy of an input optical signal comprises passing the traffic in selected channels of the signal and terminating the traffic in the remaining channels of the signal.

24. The method of claim 22, wherein a filter unit is associated with each output port.

25. The method of claim 24, wherein a copy of each input signal is forwarded to each filter unit so that any channel of any input signal may be output from any output port.

26. The method of claim 22, wherein only non-interfering channels of different input signals are forwarded to a particular output port.

* * * * *

UNITED STATES PATENT AND TRADEMARK OFFICE
CERTIFICATE OF CORRECTION

PATENT NO. : 7,266,294 B2
APPLICATION NO. : 10/726167
DATED : September 4, 2007
INVENTOR(S) : Yasuhiko Aoki et al.

It is certified that error appears in the above-identified patent and that said Letters Patent is hereby corrected as shown below:

Face Page 1, Right Column, Other Publications, Chang, C.Y. et al., after "Photonic Network Communications. vol. 6, No. 3, Nov. 2003:" delete "223-228" and insert -- 223-238 --.

Signed and Sealed this

Fourteenth Day of October, 2008

JON W. DUDAS
*Director of the United States Patent and Trademark Office*